(12) United States Patent
Yang et al.

(10) Patent No.: US 12,284,017 B2
(45) Date of Patent: Apr. 22, 2025

(54) CHANNEL STATE INFORMATION (CSI) REPORT SKIPPING

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 17/842,455

(22) Filed: Jun. 16, 2022

(65) Prior Publication Data

US 2023/0412232 A1 Dec. 21, 2023

(51) Int. Cl.
*H04W 24/10* (2009.01)
*H04B 7/06* (2006.01)
*H04W 72/1268* (2023.01)

(52) U.S. Cl.
CPC ......... *H04B 7/0658* (2013.01); *H04B 7/0626* (2013.01); *H04W 24/10* (2013.01); *H04W 72/1268* (2013.01)

(58) Field of Classification Search
None
See application file for complete search history.

(56) References Cited

U.S. PATENT DOCUMENTS

| | | | | |
|---|---|---|---|---|
| 10,757,688 | B2 * | 8/2020 | Huang | H04W 72/21 |
| 2018/0034525 | A1 * | 2/2018 | Park | H04B 7/0456 |
| 2018/0115357 | A1 * | 4/2018 | Park | H04W 72/00 |
| 2019/0109626 | A1 * | 4/2019 | Park | H04B 7/0658 |
| 2019/0207662 | A1 * | 7/2019 | Zhou | H04W 72/0446 |
| 2019/0349052 | A1 * | 11/2019 | Yum | H04L 5/0048 |
| 2020/0177254 | A1 * | 6/2020 | Lee | H04B 7/063 |
| 2020/0358504 | A1 * | 11/2020 | Takeda | H04L 5/0055 |
| 2021/0136611 | A1 * | 5/2021 | Tang | H04B 7/0456 |
| 2021/0266769 | A1 * | 8/2021 | Chung | H04L 5/0051 |
| 2022/0174620 | A1 * | 6/2022 | Cha | H04L 5/0023 |

* cited by examiner

*Primary Examiner* — Ajit Patel
(74) *Attorney, Agent, or Firm* — Patterson + Sheridan, L.L.P.

(57) ABSTRACT

Certain aspects of the present disclosure provide techniques for receiving signaling configuring the UE for channel state information (CSI) reporting and skipping CSI reporting if one or more conditions are met.

17 Claims, 11 Drawing Sheets

800 

```
┌─────────────────────────────────────┐
│  A METHOD FOR WIRELESS COMMUNICATION BY A USER  │
│              EQUIPMENT (UE)                      │
└─────────────────────────────────────┘
                    │
                    ▼                              ⎯ 802
┌─────────────────────────────────────────────────┐
│  RECEIVE SIGNALING CONFIGURING THE UE FOR CHANNEL STATE  │
│              INFORMATION (CSI) REPORTING                  │
└─────────────────────────────────────────────────┘
                    │
                    ▼                              ⎯ 804
┌─────────────────────────────────────────────────┐
│   SKIP CSI REPORTING IF ONE OR MORE CONDITIONS ARE MET   │
└─────────────────────────────────────────────────┘
```

FIG. 8

900
A METHOD FOR WIRELESS COMMUNICATION BY A NETWORK ENTITY
902
TRANSMIT SIGNALING CONFIGURING A USER EQUIPMENT (UE) FOR CHANNEL STATE INFORMATION (CSI) REPORTING
904
TRANSMIT A COMMAND TO SKIP CSI REPORTING IF ONE OR MORE CONDITIONS ARE MET
*FIG. 9*

CHANNEL STATE INFORMATION (CSI) REPORT SKIPPING

BACKGROUND

Field of the Disclosure

Aspects of the present disclosure relate to wireless communications, and more particularly, to techniques for skipping channel state information (CSI) reporting.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving signaling configuring the UE for channel state information (CSI) reporting. The method includes skipping CSI reporting if one or more conditions are met.

Another aspect provides a method for wireless communication by a network entity. The method includes transmitting signaling configuring a UE for CSI reporting, and transmitting a command to skip at least one of CSI reporting or CSI measurements if one or more conditions are met.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8 depicts a method for wireless communications.

FIG. 9 depicts a method for wireless communications.

DETAILED DESCRIPTION

Aspects of the present disclosure provide apparatuses, methods, processing systems, and computer-readable mediums for channel state information (CSI) report skipping.

In current wireless systems, such as 5G new radio (NR) systems, a network entity (e.g., a base station) may configure a user equipment (UE) to send CSI reports to the network entity. According to the configuration, the UE may measure the channel quality of the link between the UE and network entity, and send the network entity a CSI report based on the measurement. Such CSI reports are often sent periodically (e.g., according to the configuration). CSI reports allow the network entity to optimize communication on the link between itself and a UE.

In some scenarios, CSI reports may contain the same or similar CSI information as previous reports. For example, when channel conditions change little (e.g., when a UE is stationary), CSI reports may be redundant or unnecessary to channel optimization procedures implemented by the network entity, because the network entity will have already received the (same or similar) CSI information in earlier CSI reports. CSI reports carrying same or similar information waste transmission resources, increase UE power consumption, and increase potential interference.

Aspects of the present disclosure provide techniques for skipping same or similar CSI reports. Both a UE and a network entity may have CSI report skipping capability. Techniques disclosed herein may allow a UE to skip CSI reporting for a certain time window or for a certain number or percentage of CSI reports, which may help avoid the potential waste of resources caused when transmitting same or similar information in redundant CSI report, and may save UE battery.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
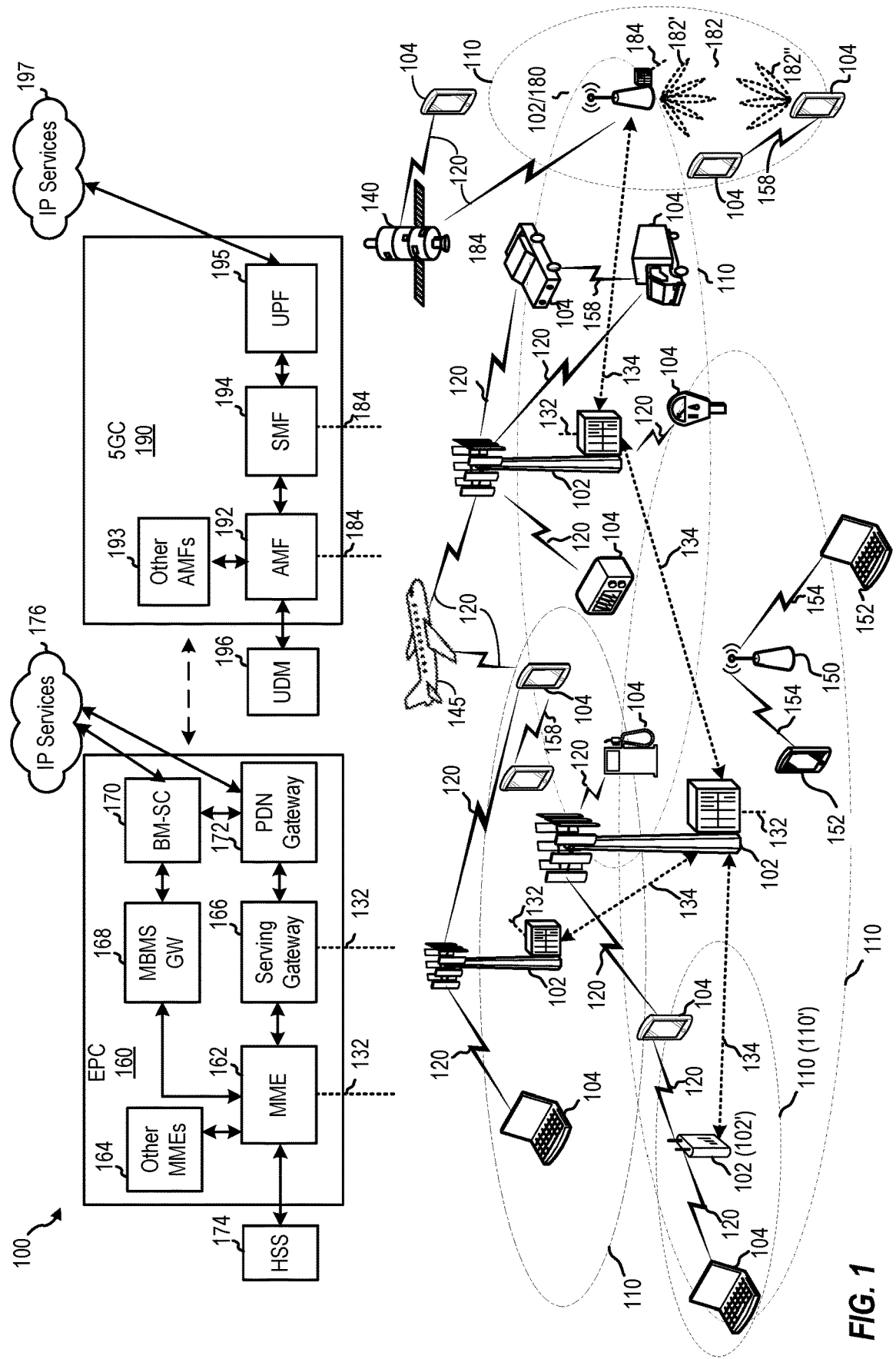
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
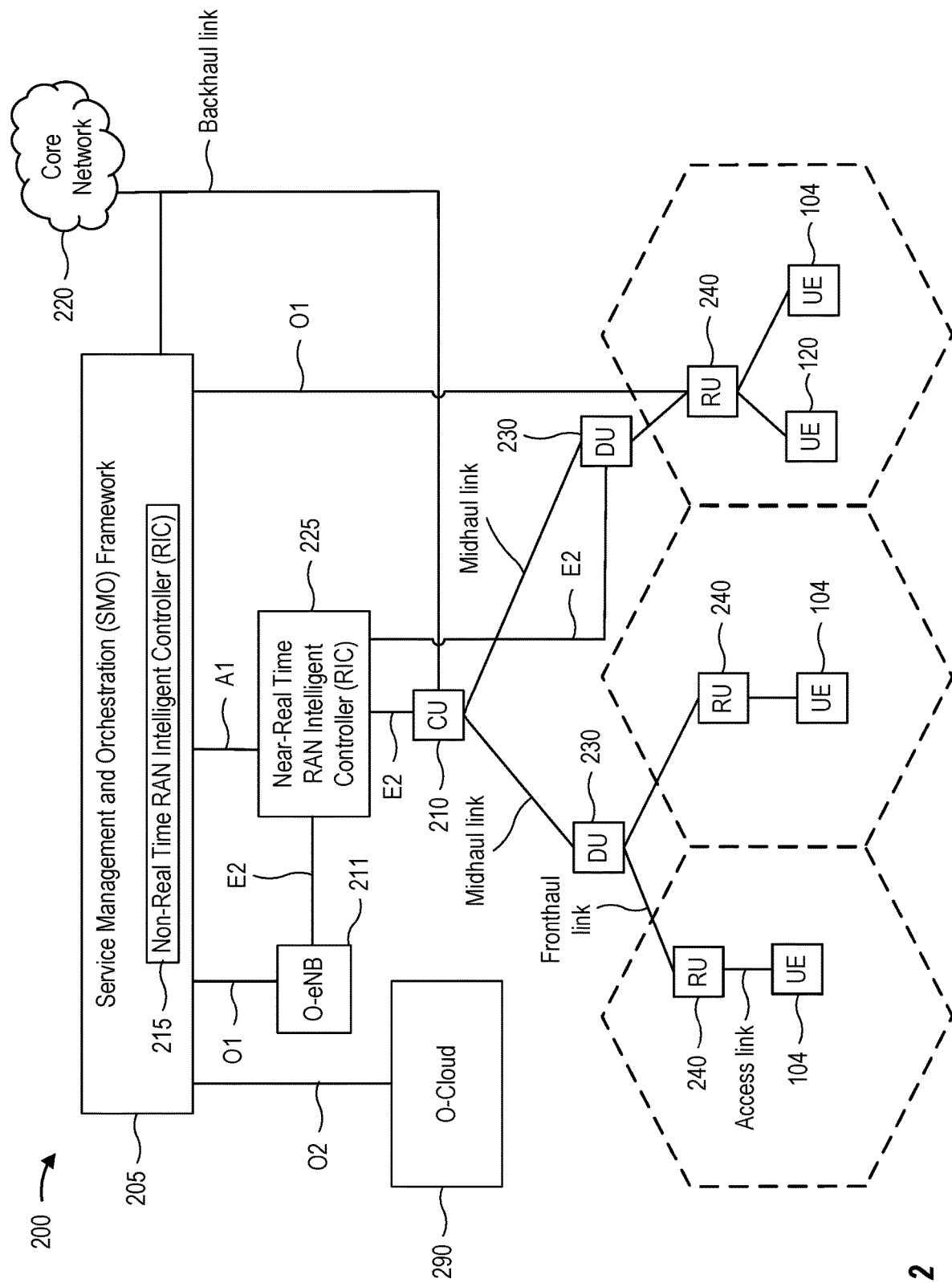
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
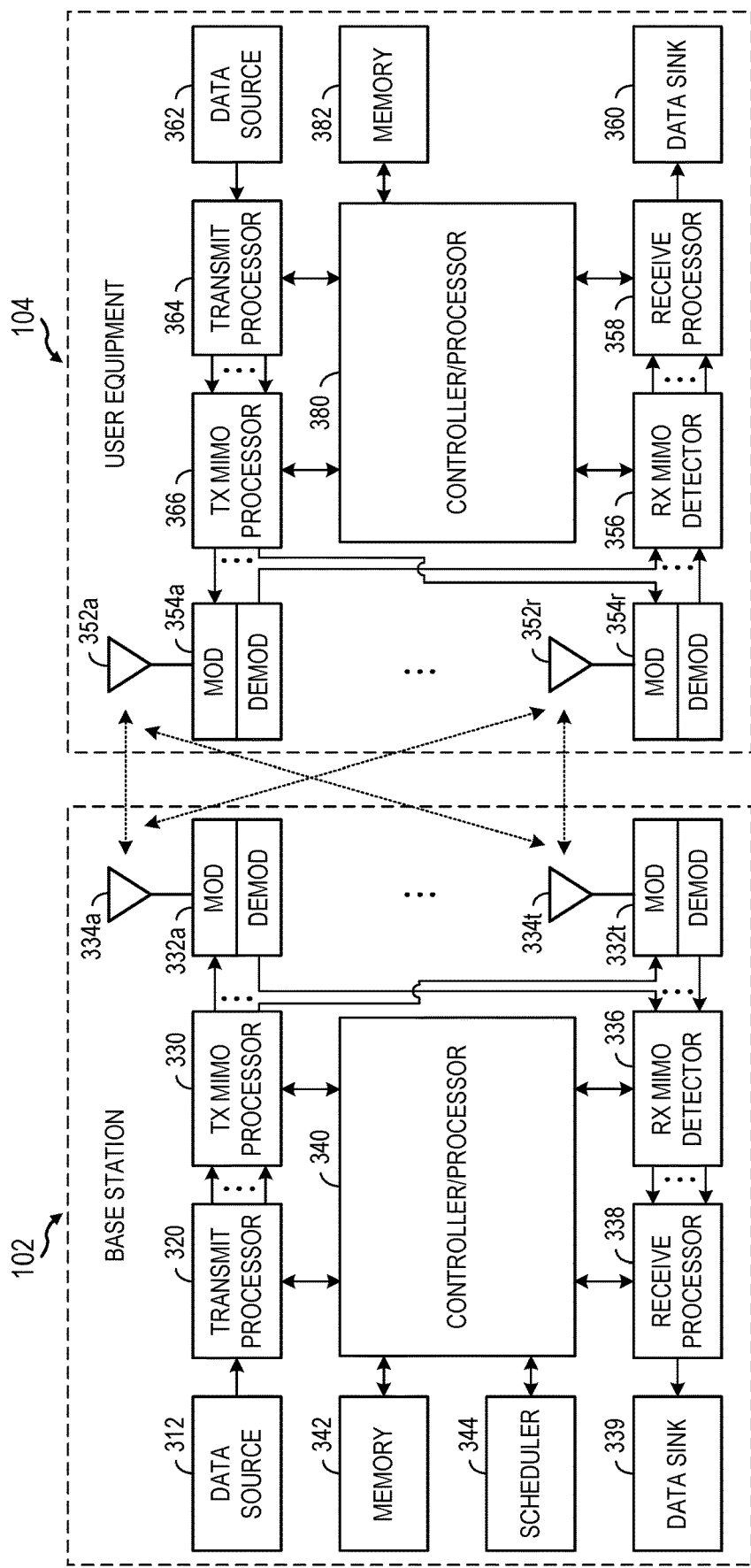
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "trans-mitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
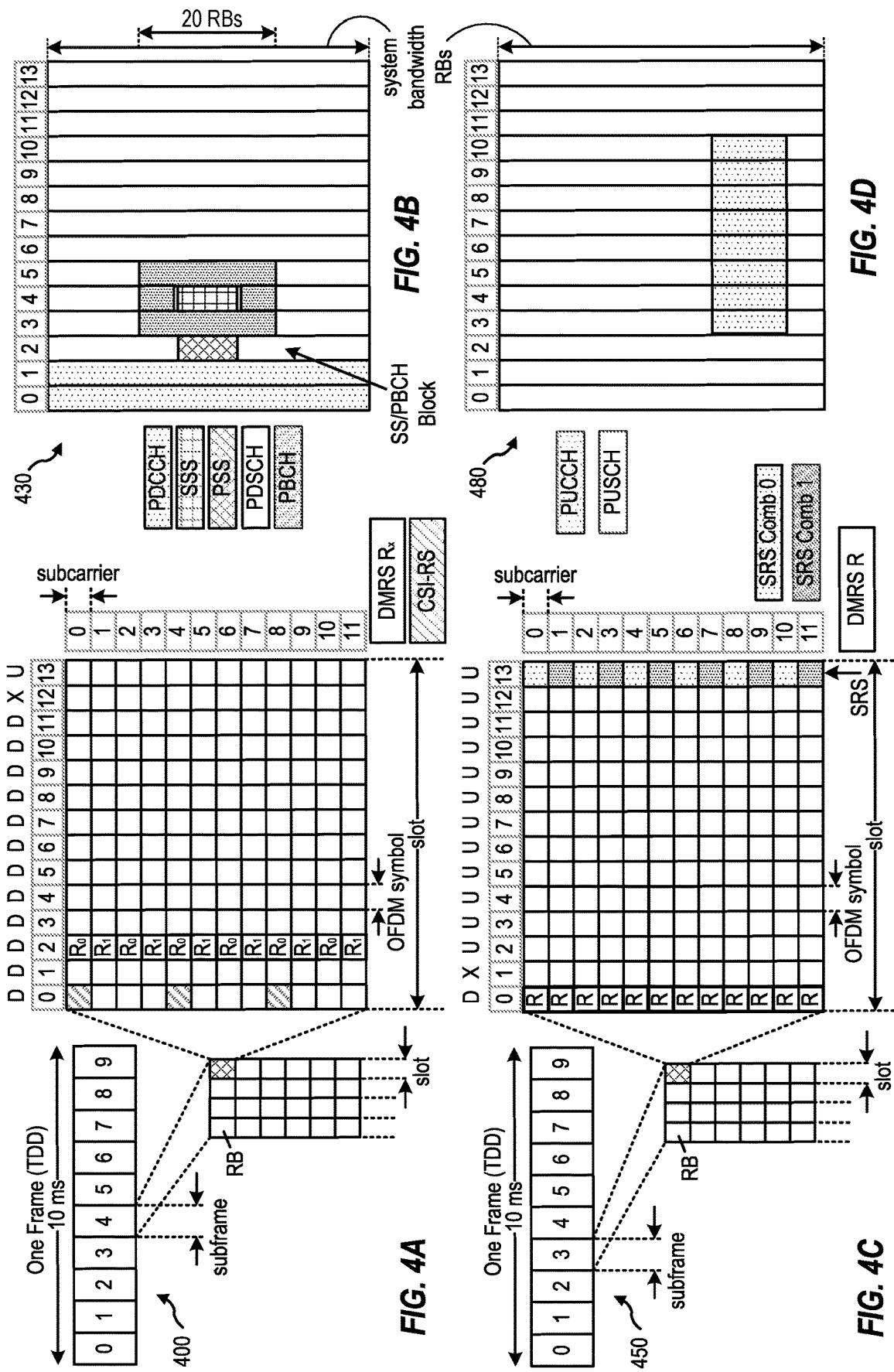
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$, is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example CSI Reporting

Channel state information (CSI) may refer to channel properties of a communication link. The CSI may represent the combined effects of, for example, scattering, fading, and power decay with distance between a transmitter and a receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically measured at the receiver, quantized, and fed back to the transmitter.

The time and frequency resources that can be used by a user equipment (UE) to report CSI are controlled by a base station (BS) (e.g., gNB). CSI may include channel quality indicator (CQI), precoding matrix indicator (PMI), CSI-RS resource indicator (CRI), SS/PBCH Block Resource indicator (SSBRI), layer indicator (LI), rank indicator (RI) and/or L1-RSRP. However, as described below, additional or other information may be included in the report.

A UE may be configured by a BS for CSI reporting. The BS may configure UEs for the CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

For the Type II codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI on physical uplink control channel (PUCCH) may be triggered via RRC. Semi-persistent CSI reporting on physical uplink control channel (PUCCH) may be activated via a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI).

The UE may report the CSI feedback (CSF) based on the CSI report configuration and the CSI report trigger. For example, the UE may measure the channel on which the triggered CSI-RS resources (associated with the CSI report configuration) is conveyed. Based on the measurements, the UE may select a preferred CSI-RS resource. The UE reports the CSF for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink (DL) bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., reportFreqConfiguration contained in a CSI-ReportConfig) which indicates a frequency granularity of the CSI report, where a subband may be defined as $N_{PRB}^{SB}$ contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

Aspects Related to CSI Report Skipping

Aspects of the present disclosure provide apparatuses, methods, processing systems, and computer-readable mediums for channel state information (CSI) report skipping.

As noted above, in current wireless systems (e.g., 5G NR), a network entity may configure a user equipment (UE) to skip an uplink (UL) physical uplink shared channel (PUSCH) transmission. Often the UL PUSCH skip may occur if there is no data present in a UE buffer upon receiving an UL grant from a network entity. This skipping functionality may reduce UE power consumption because it eliminates the need for a UE to send padding bits containing not data (e.g., 0000 bits) on resources assigned in the UL grant. Additionally, the skipping functionality for UL PUSCH transmissions may also reduce UL interference because it may help to reduce or eliminate empty traffic that may interrupt data traffic.

Aspects of the present disclosure provide what may be considered enhanced techniques for skipping CSI reporting by a UE. Such techniques may provide benefits similar to those provided by UL PUSCH skipping. Often, CSI reporting within a 5G NR network contains repeated, duplicative information transmissions from a UE. This is especially true for stationary UE scenarios (e.g., where channel conditions change little).

Example content of a CSI report includes channel quality information (CQI), a pre-coding matrix indicator (PMI), a rank indicator (RI), layer one reference signal received power (L1-RSR), and the like. Transmitting these CSI reports, which may be exactly the same from one report to the next, may unnecessarily increase 5G device power consumption, cause UL interference, and reduce UL throughput. Additionally, in cases where a network entity heavily relies on sounding reference signals (SRS) for downlink (DL) multiple-input multiple-output (MIMO) signaling in near cell configuration, a network entity may not need the information contained in a CSI report because it may already have such information from sources related to DL MIMO signaling.

Aspects of the present disclosure provide mechanisms designed to optimize skipping CSI reporting. In some cases, a UE configured for CSI reporting may automatically skip CSI reporting when one or more conditions are met.

Figure 5:
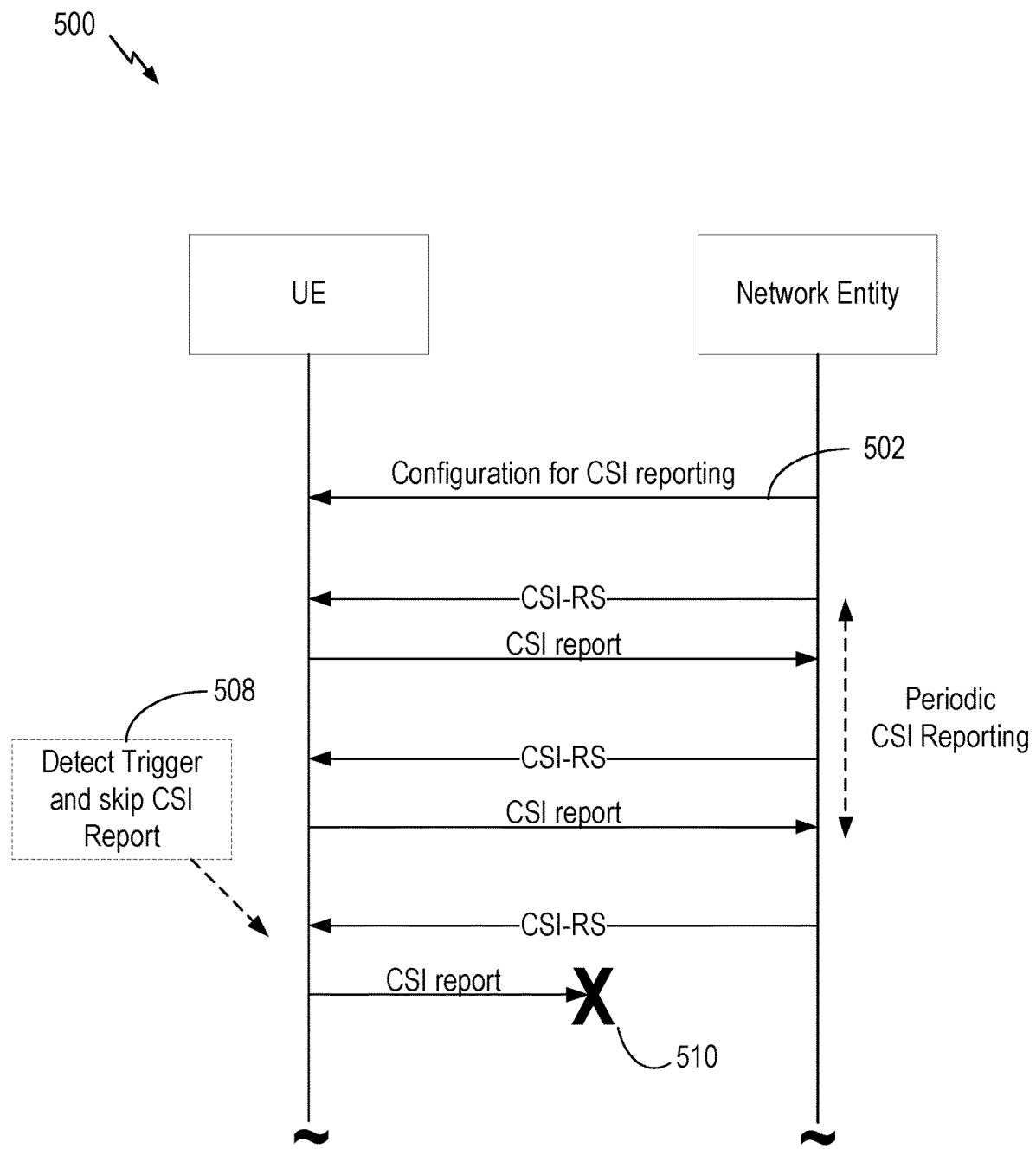
FIG. 5 depicts a call flow diagram illustrating channel state information (CSI) skipping, in accordance with aspects of the present disclosure.

The techniques proposed herein may be understood with reference to the call flow diagram 500 of FIG. 5 that shows example signaling between a UE and network entity. In some aspects, the network entity may be an example of the BS 102 depicted and described with respect to FIGS. 1 and 3 or a disaggregated base station depicted and described with respect to FIG. 2. Similarly, the UE may be an example of UE 104 depicted and described with respect to FIGS. 1 and 3. However, in other aspects, UE 104 may be another type of wireless communications device and BS 102 may be another type of network entity or network node, such as those described herein.

At 502, a network entity configures a UE for CSI reporting. For example, the UE may be configured for periodic CSI reporting via RRC signaling. In such cases, the UE may perform measurements of various CSI reference signals (CSI-RS) transmitted by the network entity and send periodic reports based on measurements thereof. In some cases, the CSI report may be signaled via a physical uplink control channel (PUCCH).

The UE may report CSI until a trigger condition is detected, at 508. Once the trigger condition is detected, the UE may skip transmitting one or more CSI reports, at 510.

Trigger conditions may include detecting that CSI measurements over multiple CSI report instances have changed less than a threshold amount. Threshold conditions may be designed to determine when CSI reporting is not needed for a period of time.

In some cases, both the UE and a network entity may be capable of detecting one or more conditions that would trigger skipping. The network entity may learn of a UE capability to skip CSI reporting, for example, via a UE capability report. The UE may learn of the network entity capability to support CSI report skipping, for example, via system information.

Figure 6:
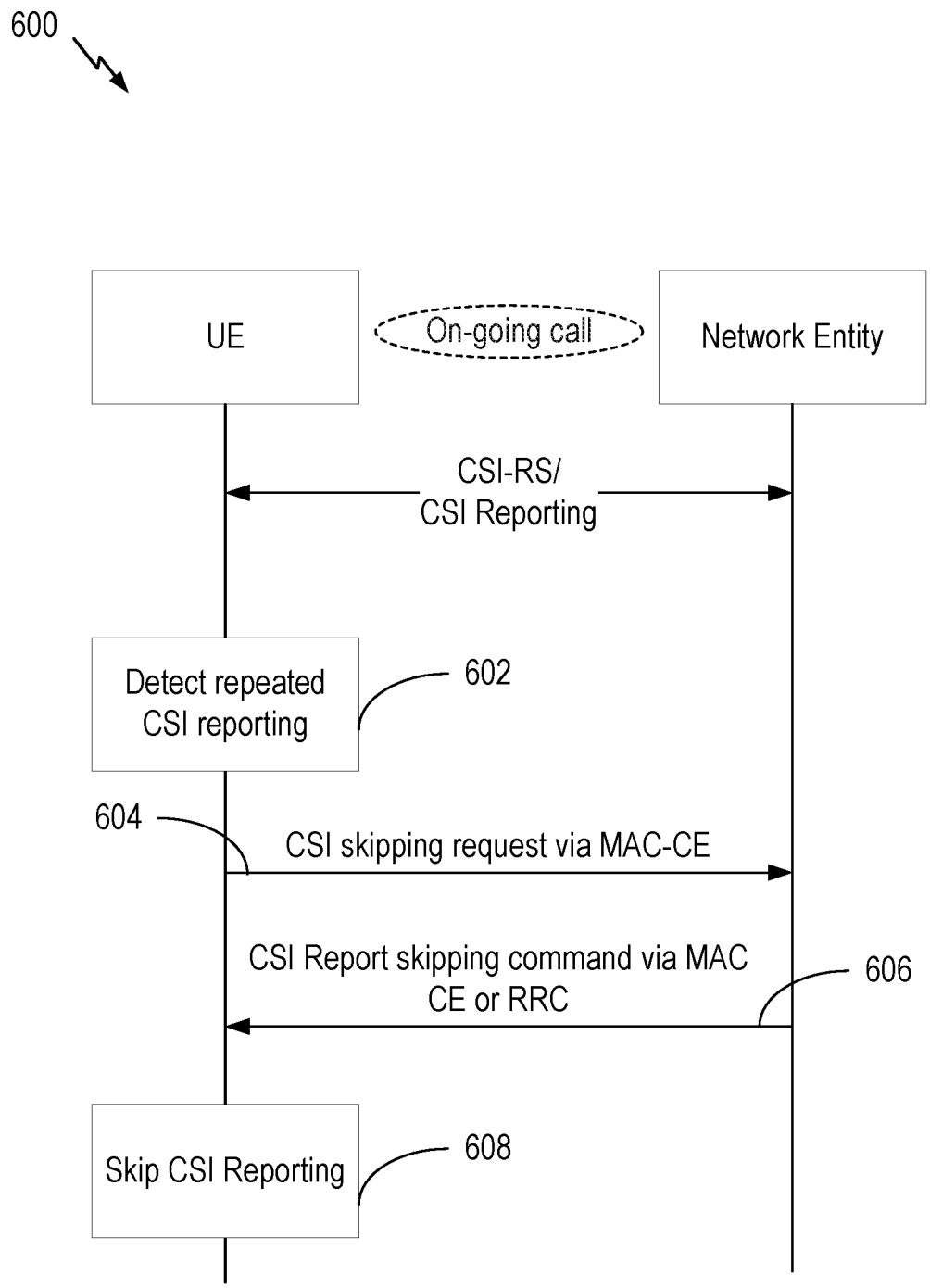
FIG. 6 depicts a call flow diagram illustrating CSI skipping, in accordance with aspects of the present disclosure.

As illustrated in the call flow diagram 600 of FIG. 6, in some cases, the UE may send a request for CSI skipping. In the illustrated example, the UE sends a CSI skipping request via a medium access control (MAC) control element (CE), at 604. The request may be sent, for example, after detecting a repeated CSI reporting (with same or similar content), at 602.

In one example, a UE may detect that a certain number of CSI reports contain same or similar information. In another example, the UE may detect that a series of CSI reports have contained same or similar information for a certain period of time, which may be predefined.

In one example, the skipping request may indicate a UE skipping preference. Skipping preference may indicate, for example, a skipping duration defining a time period in which CSI reporting is to be skipped, a skipping amount defining a number of CSI reports to be skipped, or a percentage of CSI reports to be skipped.

In response to the CSI skipping request, at 606, the network entity may send a skipping command. The skipping command may be sent, for example, via a MAC CE or radio resource control (RRC) signaling. The skipping command may define skip amount or skip duration (e.g., confirming a skipping preference indicated in the CSI skipping request. At 608, in response to the skipping command, the UE skips CSI reporting. For example, the UE skips a certain percentage of CSI reports, a certain number of CSI reports, or CSI reports falling within a skip duration as defined within the skipping request and/or command.

Figure 7:
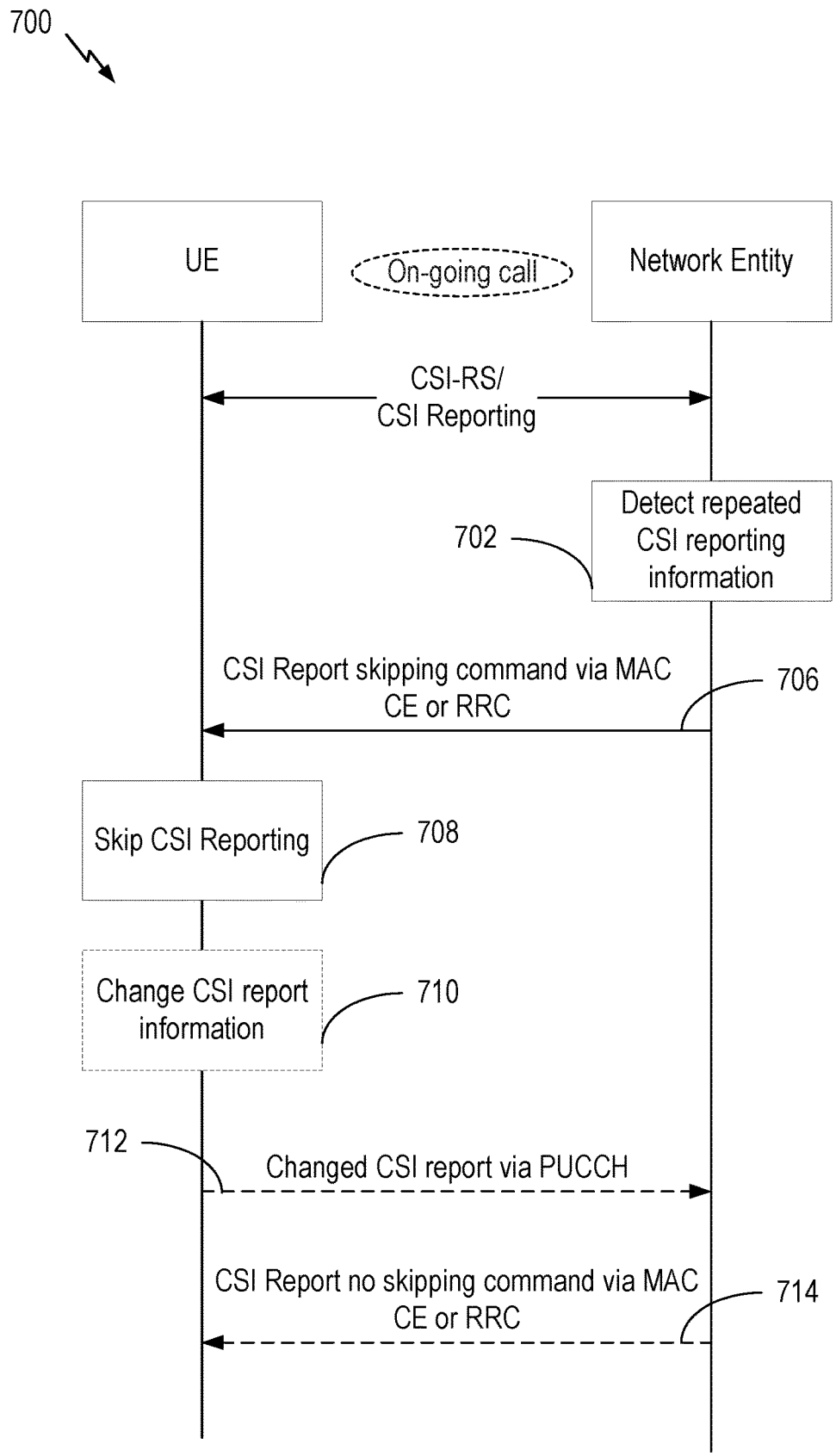
FIG. 7 depicts a call flow diagram illustrating CSI skipping, in accordance with aspects of the present disclosure.

As illustrated in the call flow diagram 700 of FIG. 7, in some cases, the network entity may detect conditions that trigger CSI report skipping.

In the illustrated example, at 702, the network entity detects same or repeated CSI reporting information. In one example, a network entity detects that a certain number of CSI reports contain same or similar information. In another example, the network entity detects that a series of CSI reports have contained same or similar information for a certain period of time, which may be predefined. In another example, the network entity detects that a series of CSI reports contain same or similar information to information that the network entity previously ascertained during UL MIMO signaling procedures.

At 706, the network entity sends a skipping command (e.g., via a MAC CE or RRC signaling). The skip command may define skip amount or skip duration. At 708, in response to the skipping command, the UE skips CSI reporting.

In some cases, the UE may detect a change in CSI report information, at 710, that warrants resuming CSI-reporting. As a results, the UE may send an indication of this change to the network entity (e.g., via PUCCH), at 712. At 714, the network entity responds (e.g., with a no-skipping command signaled via a MAC CE or RRC), to resume normal CSI reporting (e.g., per the RRC configuration). In one example, the command may indicate to the UE that no (e.g., 0%) of CSI reporting should be skipped.

A network entity may consider the UE capability to skip CSI reporting, when determining whether to enable skipping for same or similar CSI reports. When the network entity learns the UE is capable of CSI report skipping, it may trigger CSI report skipping, when it detects same or similar CSI reporting from a UE. In some cases, the network entity may also trigger CSI report skipping when it determines that it will not make use of CSI reporting from UE.

In some cases, when a network detects a UE is in a Discontinuous transmission (DTX) mode, for example, on PUCCH in channel state feedback (CSF), the network may consider UE skipping CSI transmissions and may not issue any transmission power control (TPC) commands for increasing UE transmission power, if CSI report skipping is enabled. In some cases, aperiodic CSI report skipping may be prohibited. Similarly, in some cases, skipping may be prohibited for periodic CSI reporting that is multiplexed with data on a PUSCH. In other words, assuming the PUSCH is being transmitted already (to deliver the data), there may be little saving in not including the P-CSI.

Example Operations of a User Equipment

FIG. 8 shows a method 800 for wireless communications by a UE, such as UE 104 of FIGS. 1 and 3.

Method 800 begins at 810 with receiving signaling configuring the UE for channel state information (CSI) reporting.

Method 800 then proceeds to step 820 with skipping CSI reporting if one or more conditions are met.

In one aspect, method 800 further includes detecting that CSI measurements over multiple CSI report instances have changed less than a threshold amount.

In one aspect, method 800 further includes detecting, after skipping CSI reporting, that CSI measurements over multiple CSI report instances have changed more than the threshold amount.

In one aspect, method 800 further includes transmitting the CSI measurements.

In one aspect, method 800 further includes receiving a command to resume CSI reporting, in response to the CSI measurements.

In one aspect, the CSI measurements are signaled via a physical uplink control channel (PUCCH).

In one aspect, method 800 further includes receiving a command to skip CSI reporting.

In one aspect, the command to skip indicates a skip duration or a skip quantity.

In one aspect, method 800 further includes sending a request to skip and receiving the command to skip CSI reporting, in response to the request.

In one aspect, at least one the command to skip or the request to skip is signaled via a medium access control (MAC) control element (CE).

Figure 10:
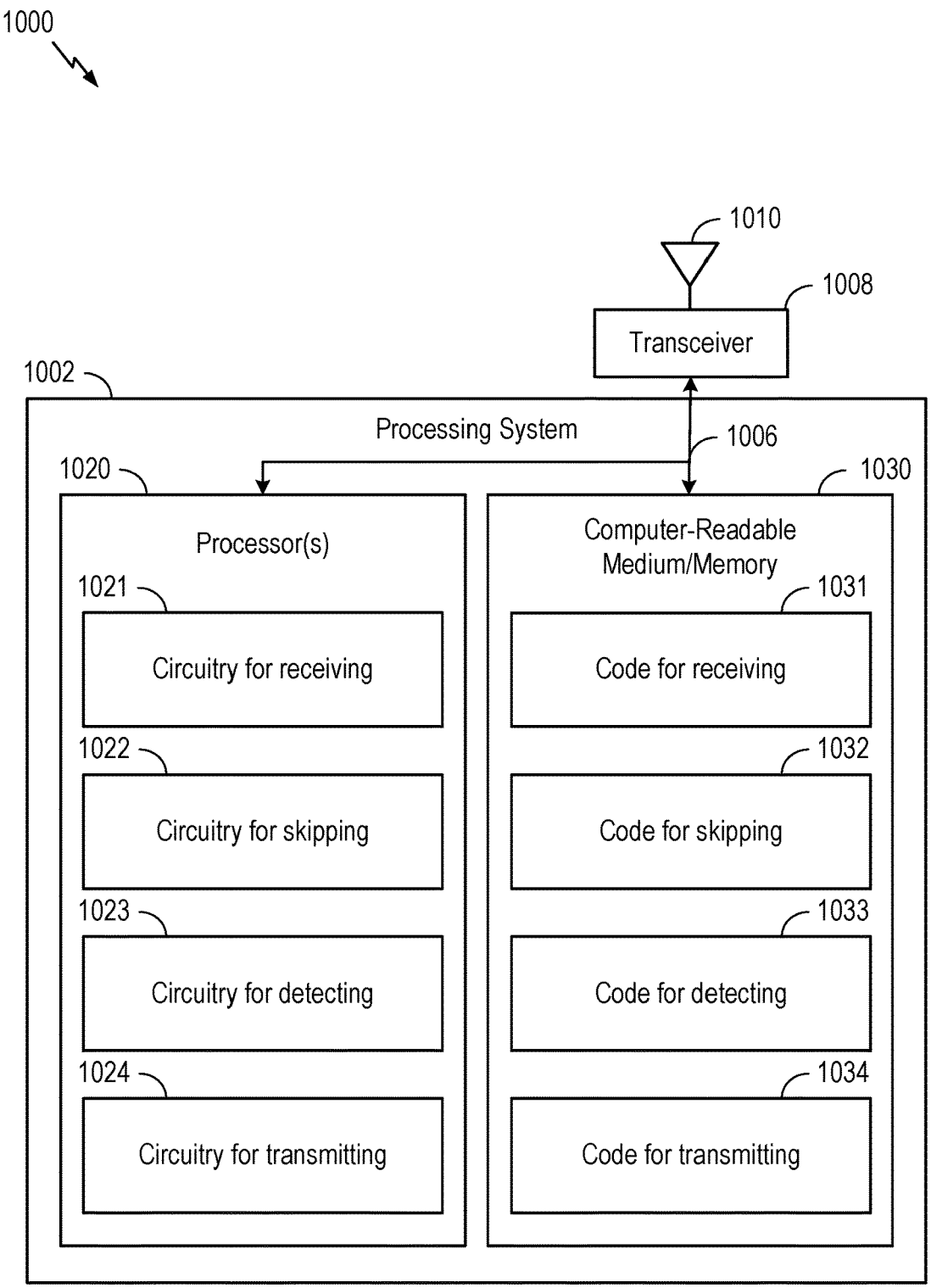
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Operations of a Network Entity

FIG. 9 shows a method 900 for wireless communications by a network entity, such as BS 102 of FIGS. 1 and 3, or a disaggregated base station as discussed with respect to FIG. 2.

Method 900 begins at 910 with transmitting signaling configuring a user equipment (UE) for channel state information (CSI) reporting.

Method 900 then proceeds to step 920 with transmitting a command to skip CSI reporting if one or more conditions are met.

In one aspect, method 900 further includes detecting that CSI measurements over received multiple CSI report instances have changed less than a threshold amount.

In one aspect, method 900 further includes receiving, after transmitting the command to skip CSI reporting, CSI measurements over multiple CSI report instances that have changed more than the threshold amount.

In one aspect, method 900 further includes transmitting a command to resume CSI reporting, in response to the CSI measurements.

In one aspect, the CSI measurements are signaled via a physical uplink control channel (PUCCH).

In one aspect, method 900 further includes determining that the network entity does not need CSI measurements received over multiple CSI report instances.

In one aspect, method 900 further includes receiving, from a UE, a request to skip.

In one aspect, at least one the command to skip or the request to skip is signaled via a medium access control (MAC) control element (CE).

In one aspect, the command to skip indicates a skip duration or a skip quantity.

Figure 11:
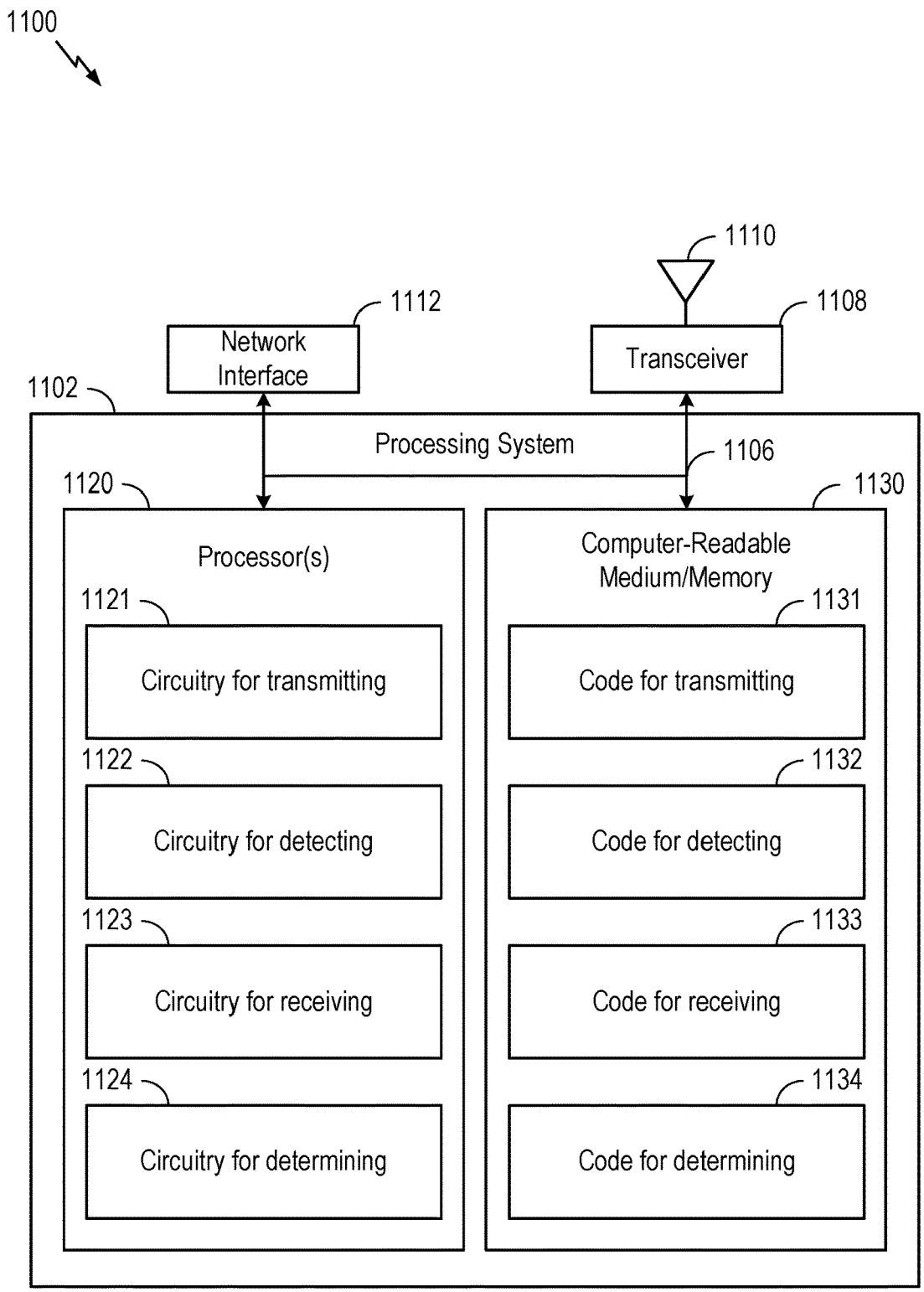
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Communications Devices

FIG. 10 depicts aspects of an example communications device 1000. In some aspects, communications device 1000 is a user equipment, such as UE 104 described above with respect to FIGS. 1 and 3.

The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes one or more processors 1020. In various aspects, the one or more processors 1020 may be representative of one or more of receive processor 358, transmit processor 364, TX MIMO processor 366, and/or controller/processor 380, as described with respect to FIG. 3. The one or more processors 1020 are coupled to a computer-readable medium/memory 1030 via a bus 1006. In certain aspects, the computer-readable medium/memory 1030 is configured to store instructions (e.g., computer-executable code) that when executed by the one or more processors 1020, cause the one or more processors 1020 to perform the method 800 described with respect to FIG. 8, or any aspect related to it. Note that reference to a processor performing a function of communications device 1000 may include one or more processors performing that function of communications device 1000.

In the depicted example, computer-readable medium/memory 1030 stores code (e.g., executable instructions) for receiving 1031, code for skipping 1032, code for detecting 1033, and code for transmitting 1034. Processing of the code 1031-1034 may cause the communications device 1000 to perform the method 800 described with respect to FIG. 8, or any aspect related to it.

The one or more processors 1020 include circuitry configured to implement (e.g., execute) the code stored in the computer-readable medium/memory 1030, including circuitry for receiving 1021, circuitry for skipping 1022, circuitry for detecting 1023, and circuitry for transmitting 1024. Processing with circuitry 1021-1024 may cause the communications device 1000 to perform the method 800 described with respect to FIG. 8, or any aspect related to it.

Various components of the communications device 1000 may provide means for performing the method 800 described with respect to FIG. 8, or any aspect related to it. For example, means for transmitting, sending or outputting for transmission may include the transceivers 354 and/or antenna(s) 352 of the UE 104 illustrated in FIG. 3 and/or transceiver 1008 and antenna 1010 of the communications device 1000 in FIG. 10. Means for receiving or obtaining may include the transceivers 354 and/or antenna(s) 352 of the UE 104 illustrated in FIG. 3 and/or transceiver 1008 and antenna 1010 of the communications device 1000 in FIG. 10.

FIG. 11 depicts aspects of an example communications device 1100. In some aspects, communications device 1100 is a network entity, such as BS 102 of FIGS. 1 and 3, or a disaggregated base station as discussed with respect to FIG. 2.

The communications device 1100 includes a processing system 1102 coupled to a transceiver 1108 (e.g., a transmitter and/or a receiver) and/or a network interface 1112. The transceiver 1108 is configured to transmit and receive signals for the communications device 1100 via an antenna 1110, such as the various signals as described herein. The network interface 1112 is configured to obtain and send signals for the communications device 1100 via communications link(s), such as a backhaul link, midhaul link, and/or fronthaul link as described herein, such as with respect to FIG. 2. The processing system 1102 may be configured to perform processing functions for the communications device 1100, including processing signals received and/or to be transmitted by the communications device 1100.

The processing system 1102 includes one or more processors 1120. In various aspects, one or more processors 1120 may be representative of one or more of receive processor 338, transmit processor 320, TX MIMO processor 330, and/or controller/processor 340, as described with respect to FIG. 3. The one or more processors 1120 are coupled to a computer-readable medium/memory 1130 via a bus 1106. In certain aspects, the computer-readable medium/memory 1130 is configured to store instructions (e.g., computer-executable code) that when executed by the one or more processors 1120, cause the one or more processors 1120 to perform the method 900 described with respect to FIG. 9, or any aspect related to it. Note that reference to a processor of communications device 1100 performing a function may include one or more processors of communications device 1100 performing that function.

In the depicted example, the computer-readable medium/memory 1130 stores code (e.g., executable instructions) for transmitting 1131, code for detecting 1132, code for receiving 1133, and code for determining 1134. Processing of the code 1131-1134 may cause the communications device 1100 to perform the method 900 described with respect to FIG. 9, or any aspect related to it.

The one or more processors 1120 include circuitry configured to implement (e.g., execute) the code stored in the computer-readable medium/memory 1130, including circuitry for transmitting 1121, circuitry for detecting 1122, circuitry for receiving 1123, and circuitry for determining 1124. Processing with circuitry 1121-1124 may cause the communications device 1100 to perform the method 900 as described with respect to FIG. 9, or any aspect related to it.

Various components of the communications device 1100 may provide means for performing the method 900 as described with respect to FIG. 9, or any aspect related to it. Means for transmitting, sending or outputting for transmission may include the transceivers 332 and/or antenna(s) 334 of the BS 102 illustrated in FIG. 3 and/or transceiver 1108 and antenna 1110 of the communications device 1100 in FIG. 11. Means for receiving or obtaining may include the transceivers 332 and/or antenna(s) 334 of the BS 102 illustrated in FIG. 3 and/or transceiver 1108 and antenna 1110 of the communications device 1100 in FIG. 11.

Example Clauses

Implementation examples are described in the following numbered clauses:

Clause 1: A method for wireless communication by a user equipment (UE), comprising receiving signaling configuring the UE for channel state information (CSI) reporting, and skipping CSI reporting if one or more conditions are met.

Clause 2: The method of clause 1, wherein the one or more conditions comprise detecting that CSI measurements over multiple CSI report instances have changed less than a threshold amount.

Clause 3: The method of clause 2, further comprising detecting, after skipping CSI reporting, that CSI measurements over multiple CSI report instances have changed more than the threshold amount, transmitting the CSI measurements, and receiving a command to resume CSI reporting, in response to the CSI measurements.

Clause 4: The method of claim 3, wherein the CSI measurements are signaled via a physical uplink control channel (PUCCH).

Clause 5: The method of any one of clauses 1-4, wherein the UE also skips CSI measurements when the one or more conditions are met.

Clause 6: The method of any one of clauses 1-5, wherein the one or more conditions comprise receiving a command to skip at least one of CSI reporting or CSI measurements.

Clause 7: The method of clause 6, wherein the command to skip indicates a skip duration, skip quantity, or a percentage of CSI reporting to skip.

Clause 8: The method of any one of clauses 6-7, further comprising sending a request to skip and receiving the command to skip CSI reporting, in response to the request.

Clause 9: The method of clause 8, wherein at least one the command to skip or the request to skip is signaled via a medium access control (MAC) control element (CE) or radio resource control (RRC) signaling.

Clause 10: A method for wireless communication by a network entity, comprising transmitting signaling configuring a user equipment (UE) for channel state information (CSI) reporting, and transmitting a command to skip at least one of CSI reporting or CSI measurements if one or more conditions are met.

Clause 11: The method of clause 10, wherein the one or more conditions comprise detecting that CSI measurements over received multiple CSI report instances have changed less than a threshold amount.

Clause 12: The method of clause 11, further comprising receiving, after transmitting the command to skip CSI reporting, CSI measurements over multiple CSI report instances that have changed more than the threshold amount and transmitting a command to resume CSI reporting and measurements, in response to the CSI measurements.

Clause 13: The method of clause 12, wherein the CSI measurements are signaled via a physical uplink control channel (PUCCH).

Clause 14: The method of any one of clauses 10-13, wherein the one or more conditions comprise determining that the network entity does not need CSI measurements received over multiple CSI report instances.

Clause 15: The method of any one of clauses 10-14, wherein the one or more conditions comprise receiving, from a UE, a request to skip.

Clause 16: The method of clause 15, wherein at least one of the command to skip or the request to skip is signaled via a medium access control (MAC) control element (CE) or radio resource control (RRC) signaling.

Clause 17: The method of any one of clauses 10-16, wherein the command to skip indicates a skip duration, skip quantity, or skip percentage.

Clause 18: An apparatus, comprising: a memory comprising executable instructions; and a processor configured to execute the executable instructions and cause the apparatus to perform a method in accordance with any one of Clauses 1-17.

Clause 19: An apparatus, comprising means for performing a method in accordance with any one of Clauses 1-17.

Clause 20: A non-transitory computer-readable medium comprising executable instructions that, when executed by a processor of an apparatus, cause the apparatus to perform a method in accordance with any one of Clauses 1-17.

Clause 21: A computer program product embodied on a computer-readable storage medium comprising code for performing a method in accordance with any one of Clauses 1-17.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:
one or more processors configured to execute instructions stored on one or more memories and to cause the UE to:
receive signaling configuring the UE for channel state information (CSI) reporting; and
skip CSI reporting if one or more conditions are met, wherein the one or more conditions comprise a detection that CSI measurements over multiple CSI report instances have changed less than a threshold amount.

2. The UE of claim 1, wherein the one or more processors are further configured to cause the UE 10:
detect, after skipping CSI reporting, that CSI measurements over multiple additional CSI report instances have changed more than the threshold amount;
transmit the CSI measurements; and
receive a command to resume CSI reporting, in response to the CSI measurements.

3. The UE of claim 2, wherein the CSI measurements are signaled via a physical uplink control channel (PUCCH).

4. The UE of claim 1, wherein the UE also skips the CSI measurements when the one or more conditions are met.

5. The UE of claim 1, wherein the one or more conditions further comprise:
reception of a command to skip at least one of CSI reporting or CSI measurements.

6. The UE of claim 5, wherein the command to skip indicates a skip duration, skip quantity, or a percentage of CSI reporting to skip.

7. The UE of claim 5, wherein the one or more processor are further configured to cause the UE to send a request to skip and receiving the command to skip CSI reporting, in response to the request.

8. The UE of claim 7, wherein at least one the command to skip or the request to skip is signaled via a medium access control (MAC) control element (CE) or radio resource control (RRC) signaling.

9. A network entity, comprising:
one or more processors configured to execute instructions stored on one or more memories and to cause the network entity to:
transmit signaling configuring a user equipment (UE) for channel state information (CSI) reporting; and
transmit a command to skip at least one of CSI reporting or CSI measurements if one or more conditions are met, wherein the one or more conditions comprise a detection that CSI measurements over multiple CSI report instances have changed less than a threshold amount.

10. The network entity of claim 9, wherein the one or more processors are further configured to cause the network entity to:
receive, after transmitting the command to skip CSI reporting, the CSI measurements over multiple additional CSI report instances that have changed more than the threshold amount and
transmit a command to resume CSI reporting and measurements, in response to the CSI measurements.

11. The network entity of claim 10, wherein the CSI measurements are signaled via a physical uplink control channel (PUCCH).

12. The network entity of claim 9, wherein the one or more conditions further comprise:
a determination that the network entity does not need CSI measurements received over multiple CSI report instances.

13. The network entity of claim 9, wherein the one or more conditions comprise:
reception of a request to skip from the UE.

14. The network entity of claim 13, wherein at least one of the command to skip or the request to skip is signaled via a medium access control (MAC) control element (CE) or radio resource control (RRC) signaling.

15. The network entity of claim 9, wherein the command to skip indicates a skip duration, skip quantity, or skip percentage.

16. A method for wireless communication by a user equipment (UE), comprising:
receiving signaling configuring the UE for channel state information (CSI) reporting; and
sipping CSI reporting if one or more conditions are met, wherein the one or more conditions comprise a detection that CSI measurements over multiple CSI report instances have changed less than a threshold amount.

17. A method for wireless communication by a network entity, comprising:
transmitting signaling configuring a user equipment (UE) for channel state information (CSI) reporting; and
transmitting a command to skip at least one of CSI reporting or CSI measurements if one or more conditions are met, wherein the one or more conditions comprise a detection that CSI measurements over multiple CSI report instances have changed less than a threshold amount.

\* \* \* \* \*